United States Patent
Liu et al.

(10) Patent No.: US 7,143,133 B2
(45) Date of Patent: Nov. 28, 2006

(54) SYSTEM AND METHOD FOR APPENDING SERVER-SIDE GLOSSARY DEFINITIONS TO TRANSIENT WEB CONTENT IN A NETWORKED COMPUTING ENVIRONMENT

(75) Inventors: James Liu, Sunnyvale, CA (US); Raghavender Pillutla, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 764 days.

(21) Appl. No.: 10/286,580

(22) Filed: Nov. 1, 2002

(65) Prior Publication Data

US 2004/0088351 A1 May 6, 2004

(51) Int. Cl.
*G06F 15/16* (2006.01)

(52) U.S. Cl. .......................... 709/203; 709/217; 707/3; 707/6

(58) Field of Classification Search ................ 709/203, 709/219–217, 200–202, 224–227; 707/100, 707/3, 6–7
See application file for complete search history.

(56) References Cited

U.S. PATENT DOCUMENTS 6,581,065 B1 * 6/2003 Rodkin et al. .............. 707/102

2003/0182291 A1 * 9/2003 Kurupati et al. ............ 707/100
2005/0010556 A1 * 1/2005 Phelan ......................... 707/3

OTHER PUBLICATIONS

Author Unknown. "JavaScript SE". Que Corporation. 1996. Chapter 16.*

* cited by examiner

*Primary Examiner*—Moustafa M. Meky
(74) *Attorney, Agent, or Firm*—Park, Vaughan & Fleming, LLP

(57) ABSTRACT

One embodiment of the present invention provides a system and method for appending server-side glossary definitions to transient Web content in a networked computing environment. A glossary database stores a glossary, which includes a plurality of structured records. Each structured record is keyed by a unique identifier derived from a key word and contains a definition associated with the key word. A parser receives Web content, which includes text in transit to a Web client, and parses the text into one or more tokens corresponding to one such key word. A comparator module matches the tokens against each unique identifier in the glossary and retrieves each structured record containing a matching unique identifier. A constructor inserts a hyperlink in place of the text corresponding to each matched token and references the definition contained in the retrieved structured record for the matching unique identifier.

40 Claims, 11 Drawing Sheets

SYSTEM AND METHOD FOR APPENDING SERVER-SIDE GLOSSARY DEFINITIONS TO TRANSIENT WEB CONTENT IN A NETWORKED COMPUTING ENVIRONMENT

BACKGROUND

1. Field of the Invention

The present invention relates in general to server-side glossary provision, and, in particular, to a system and method for appending server-side glossary definitions to transient Web content in a networked computing environment.

2. Related Art

Web browsers are popular applications for retrieving and viewing content over the World Wide Web ("Web") and have gained wide acceptance for providing a de facto standardized user interface for presenting various forms of information. Operationally, Web browsers retrieve Web content through a client-server dialogue consisting of request-response exchanges.

Web content is typically composed of individual Web pages written in a tag-delimited page description language, such as the Hypertext Markup Language (HTML) or equivalents. Each Web page can include hyperlinks identifying additional content for retrieval through embedded Uniform Resource Identifier (URI) links. Selecting a hyperlink via the Web browser triggers a server request for additional Web content.

Web content adheres to no prescribed form. However, preferred style conventions generally specify using hyperlinks to define unfamiliar terms appearing in Web content reference linked definitions. Such use of definitional hyperlinks is analogous to the printed document convention of using footnotes or endnotes. Definitional hyperlinks can aid comprehension of Web content by clarifying cryptic terms and explaining technical jargon, such as often found with system performance metrics and other arcane utilities and applications. As well, definitional hyperlinks can assist in providing Web content internationalization and localization, and generalized and specialized vocabulary for targeted audiences.

Presently, definitional hyperlinks are embedded directly into Web content by their authors. This client-side approach has several drawbacks. In the usual case, these definitions are not normalized to other definitions used in related Web content originating from other sources. As well, embedded definitional hyperlinks require a priori knowledge of those terms in the Web content that may require further explanation. The definitions provided, though, reflect the authors' biases and discretion, and may fail to correctly anticipate the needs of the audience.

In addition, providing meaningful embedded definitional hyperlinks requires maintaining the currency of the information provided. Definitions included directly into Web pages can become out-of-date over time. Similarly, definitions provided remotely through hyperlinks require periodic synchronization between each Web page and the definitional resources to ensure currency and to avoid broken hyperlinks. Often, maintaining definitional hyperlinks, either as included content or indirectly as linked content, can complicate revising definitions due to the multiple locations at which the various definitional components are stored.

In the prior art, there are currently two widely-used client-side approaches to providing definitional hyperlinks within Web content. The first approach, mentioned above, involves embedding hyperlinks into static Web pages referencing glossary definitions either directly as included Web content or indirectly through URI links. At each client, the glossary definitions appear in the Web browser as pop-up dialogue windows or as separate Web pages. In this approach, the server plays a passive role and any inclusion of definitional hyperlinks is left to the discretion of the Web content author. This approach suffers from the need for a priori knowledge and the requirements to maintain the currency and synchrony of Web content to origin sources. As well, Web content cannot be easily tailored to an audience knowledge level or internationalized or localized for individual markets.

In the second client-side approach, a plug-in component supplements the functionality of the Web browser to provide glossary definitions to downloaded Web content. In one variation, the author of the Web content embeds static hyperlinks into the Web content. A plug-in component downloads a glossary on to the client from a remote server to work with the plug-in component. The Web browser retrieves definitions for the downloaded glossary whenever a definitional hyperlink is selected. The use of a downloaded glossary provides a local repository of definitions and avoids the need to download individual definitions on-demand. Web browser responsiveness is therefore enhanced. Nevertheless, the downloaded glossary uses storage local to the client and requires content synchronization between the remote server from which the glossary was retrieved and the downloaded glossary local to the client.

In a further variation, the plug-in component includes a parser that evaluates each individual Web page for definable terms and retrieves each glossary definition from a remote server.

The use of a parser allows the plug-in component to provide consistent normalized definitions over a wide-range of Web content, independent of source. Definitional consistency is accordingly enhanced. However, the parser imposes a heavy processing load on the client and dramatically reduces the performance of Web content download and display. Furthermore, the parser is limited to only the vocabulary immediately available to the plug-in component and requires periodic updates to maintain currency and synchronization between the parser and the remote glossary server. As well, the form of plug-in component duplicates glossary insertion on each client downloading the same Web content.

Therefore, there is a need for a server-side approach to appending definitions into downloaded Web content without requiring a priori knowledge of content definitional considerations or modifications to client-side Web browser functionality. Preferably, such an approach would maintain glossaries off-line from clients and provide opportunities for staging definitionally-processed Web content in intermediate caches. As well, such an approach would advantageously utilize superior server processor resources and avoid duplicative insertions of glossary definitions in Web content downloaded by multiple clients.

There is a further need for an approach to providing glossary definitions in downloaded Web content using server-based glossaries and rule sets. Preferably, such an approach would provide an opportunity for localization, internationalization, generalization, and specialization of definitions available through server-embedded hyperlinks. Moreover, such an approach would provide a transparent solution to including definitional hyperlinks to clients visually indistinguishable across Web browser environments.

SUMMARY

Web content is received or intercepted by a server-side glossary engine prior to delivery to a requesting Web browser executing on a client. The glossary engine parses the Web content into individual tokens representing preferably case-insensitive key words. The tokens are matched against a glossary as a stream of one or more tokens in a logically-defined sliding window. The sliding window allows individual terms and phrases to be matched against the glossary. For each match, a corresponding definition is retrieved and a definitional hyperlink is inserted into the Web content. Optionally, one or more rule sets containing rules governing the insertion of definitions into Web content are applied.

One embodiment of the present invention provides a system and method for appending server-side glossary definitions to transient Web content in a networked computing environment. A glossary database stores a glossary, which includes a plurality of structured records. Each structured record is keyed by a unique identifier derived from a key word and contains a definition associated with the key word. A parser receives Web content, which includes text in transit to a Web client, and parses the text into one or more tokens corresponding to one such key word. A comparator module matches the tokens against each unique identifier in the glossary and retrieves each structured record containing a matching unique identifier. A constructor inserts a hyperlink in place of the text corresponding to each matched token and references the definition contained in the retrieved structured record for the matching unique identifier.

In a variation on this embodiment, a hash module hashes each key word into a hash key from a base value and stores the hash key as the unique identifier into the structured record for the associated key word, and hashes the one or more tokens using the base value prior to matching against each unique identifier in the glossary.

In a variation on this embodiment, a database module forms a tuple, comprising the hash key, the base value, the definition for the associated key word, an original location reference, and a time stamp, and stores one such tuple in each structured record in lieu of the definition associated with the keyword In a variation on this embodiment, a rules database stores a set of rules comprising a plurality of structured records, each structured record containing a rule governing insertion of the definitions into the Web content.

In a variation on this embodiment, a rules module applies at least one such rule from the rules set prior to inserting the hyperlink in place of the text.

In a variation on this embodiment, a Web browser presents the referenced definition in a pop-up dialogue window responsive to a selection of the inserted hyperlink.

In a variation on this embodiment, a page cache transitorily stages the Web content following insertion of the hyperlink for subsequent retrieval by other Web clients.

In a variation on this embodiment, the glossary database provides one or more glossaries relating to at least one of internationalization, localization, generalization, and specialization.

In a variation on this embodiment, an input buffer receives the text stream as a Web page comprising one or more statements written as a tag-delimited page description language.

In a variation on this embodiment, the page description language comprises HTML.

In a variation on this embodiment, a matching module logically defines a sliding window comprising one or more of the tokens, and matching successive combinations of the tokens within the sliding window against the identifiers in the glossary.

In a variation on this embodiment, each identifier is formed as a combination of one or more key words.

In a variation on this embodiment, each token is normalized to a root word form.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Client-Side Prior Art Systems

Figure 1:
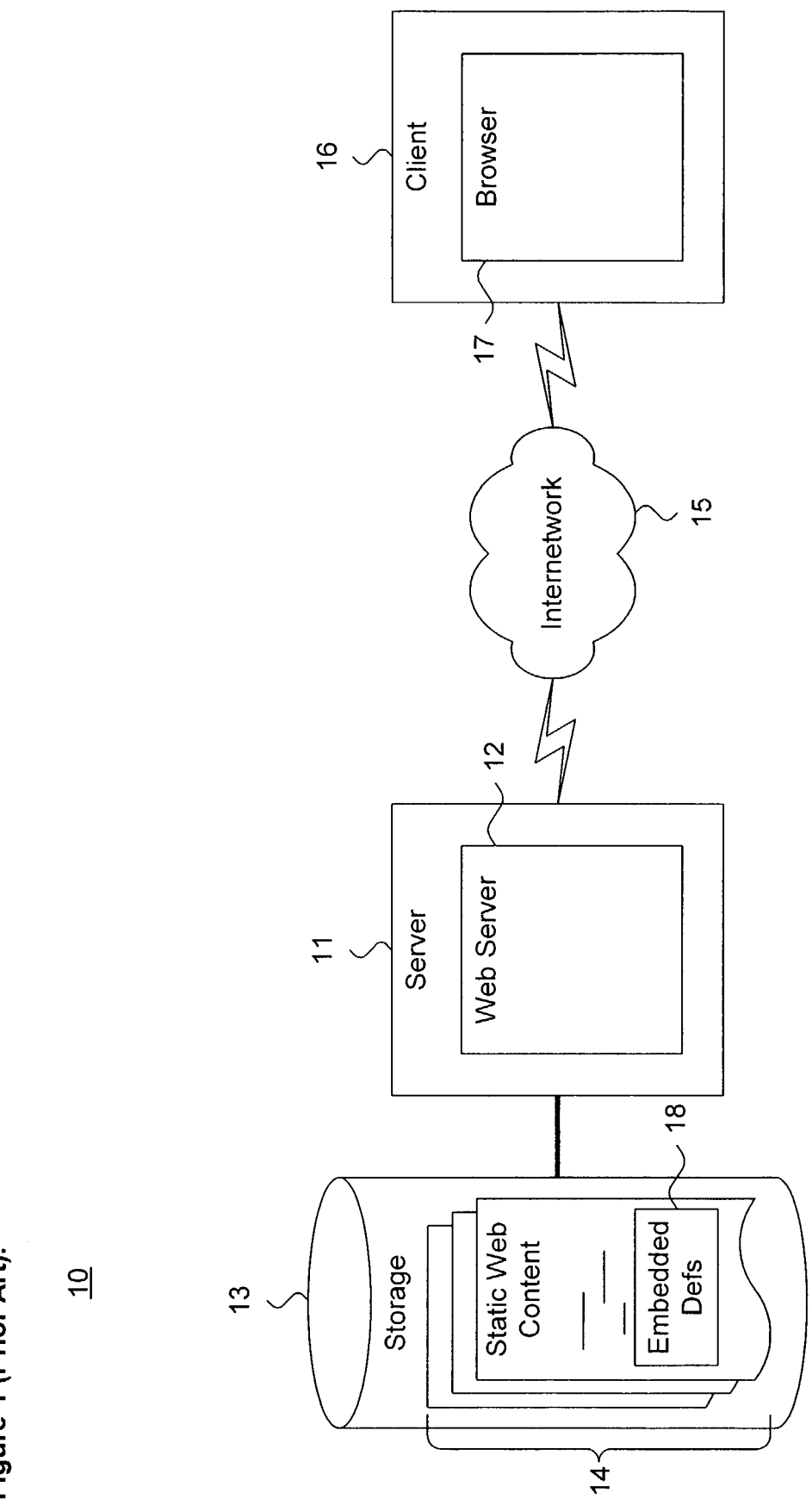
FIG. 1 is a block diagram showing a prior art system for including glossary definitions in downloaded Web content in a networked computing environment.

FIG. 1 is a block diagram showing a prior art system for including glossary definitions 11 in downloaded Web content 14 in a networked computing environment 10. A server 11 and client 16 communicate via an internetwork 15, such as the Internet, or any other form of wide-area or local-area network or combinations thereof. A Web browser 17 executing on the client 16 sends requests for Web content to the server. In response, a Web server 12 executing on the server 11 retrieves static Web content 14 from an attached storage device 13 for transmission back to the client 16. Preferably, the Web content 14 is written in a tag-delimited page description language, such as HTML. The static Web content 14 includes embedded definitions 18 in the form of hyperlinks. Each hyperlink either references a definition directly included as part of the static Web content 14 or links to a remote definitional resource through a URI link.

The inclusion of embedded definitions 18 within the static Web content 14 requires a priori knowledge of those definitions needed by users and imposes a maintenance responsibility on the static Web content provider. However, the functionality of the Web browser 17 is unaffected by the embedded definitions 18, which appear as pop-up dialogue windows or individual Web pages.

Figure 2:
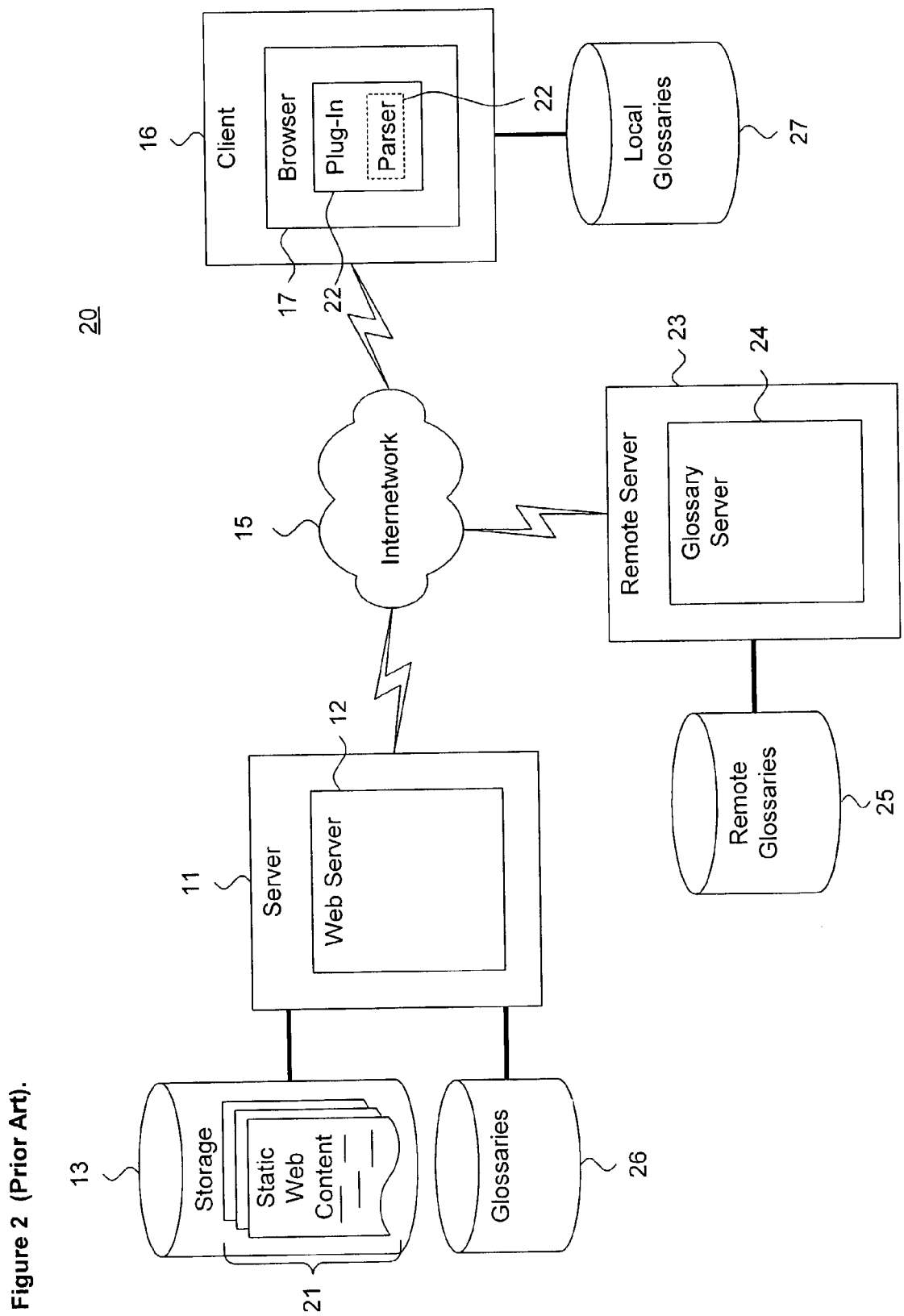
FIG. 2 is a block diagram showing a prior art system for inserting client-side glossary definitions into downloaded Web content in a networked computing environment.

FIG. 2 is a block diagram showing a prior art system for inserting client-side glossary definitions 22 into downloaded Web content 21 in a networked computing environment 20. As before, the server 11 and client 16 communicate via the internetwork 15. In response, the Web server 12 executing on the server 11 retrieves static Web content 21 from the attached storage device 13 for transmission back to the client 16.

The Web browser 17 includes a plug-in component 22 that parses and inserts glossary definitions into the static Web content 21. In one form, the plug-in component 22 references local glossaries 27 downloaded from external glossaries 26 maintained by the server 11 or remote glossaries 25 maintained by a dedicated glossary server 24 executing on a remote server 23. This form of plug-in component 22 requires synchronization between the local glossaries 27 and the external glossaries 26 and remote glossaries 25.

In an alternate form, the plug-in component 22 includes a parser 28 that parses the downloaded static Web content 21 upon receipt by, but prior to display on, the Web browser 17. The parser 28 identifies terms within each page of static Web content 21 and retrieves corresponding definitions from the external glossaries 26 or remote glossaries 25, as necessary. This form of plug-in component 22 can negatively impact the performance of the Web browser 17. As well, the functionality of the Web browser 17 is modified and such modifications may not be available on a cross-platform, operating environment-independent matter.

Server-Side Glossary Definition Appending System

Figure 3A:
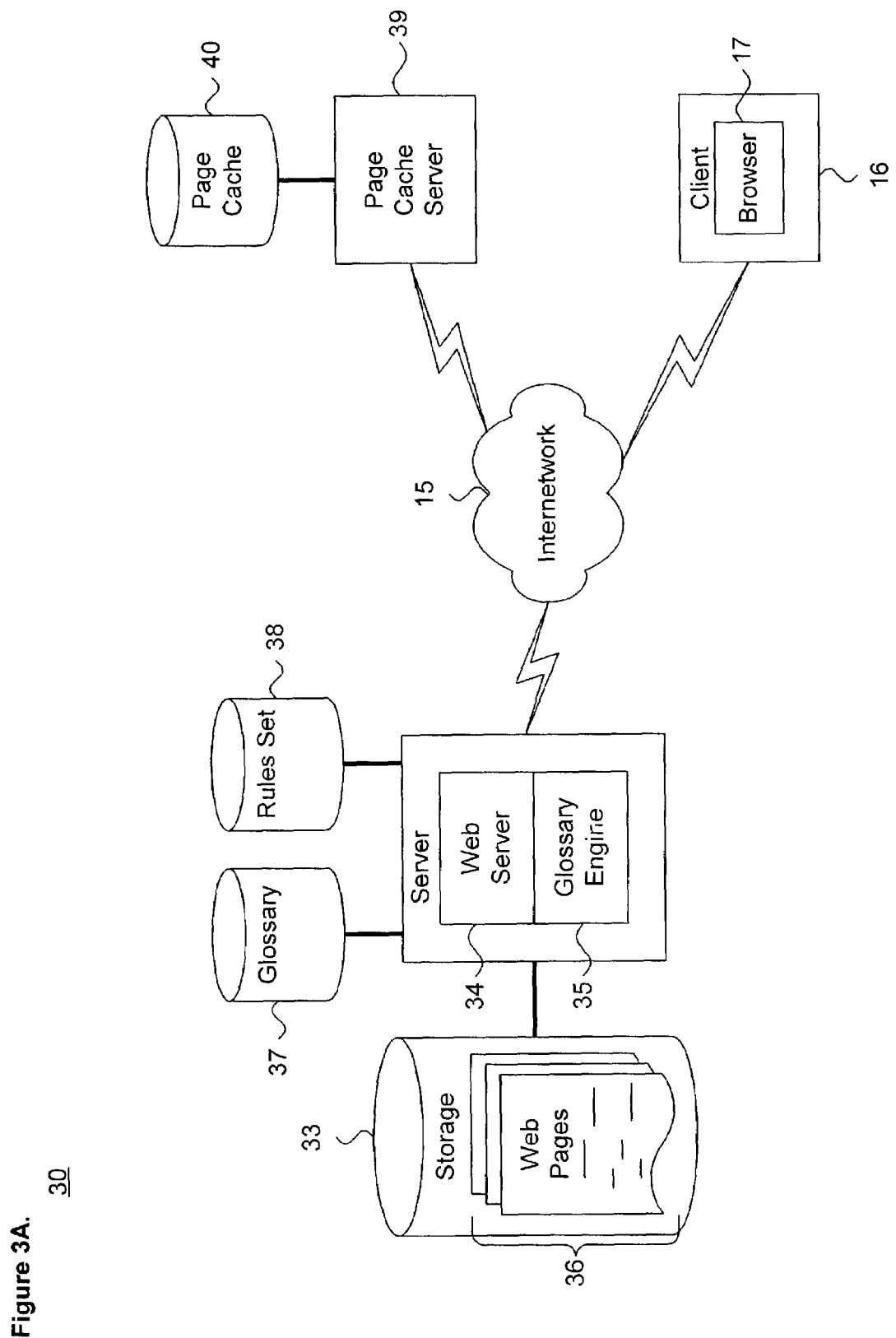
FIG. 3A is a block diagram showing a system for appending server-side glossary definitions to transient Web content in a networked computing environment in accordance with an embodiment of the present invention.

FIG. 3A is a block diagram showing a system for appending server-side glossary definitions 31 to transient Web content 36 in a networked computing environment 30 in accordance with an embodiment of the present invention. A server 31 and client 16 communicate via an internetwork 15, such as the Internet, or any other form of wide-area or local-area network or combinations thereof. A Web browser 17 executing on the client 16 sends requests for Web content from the server 31. In response, a Web server 34 executing on the server 31 retrieves static Web content 36 stored on attached storage device 33 for transmission back to the client 16. The Web content 36 can be written in a tag-delimited page description language, such as HTML, or can be in an unstructured format that includes parseable text.

Prior to sending each requested Web page to the client 16, a glossary engine 35 executing on the server 31 intercepts each requested Web page from the Web server 34 into an input buffer (not shown). The Web pages are parsed to identify definable terms and to generate the necessary definitional hyperlinks, as further described below with reference to FIG. 4. Briefly, the glossary engine 35 references an attached glossary 37 and, optionally, a rule set 38, during the processing of each Web page. Upon the completion of parsing and processing, each Web page will have been modified, if necessary, to include definitional hyperlinks, and the modified Web pages are forwarded to the requesting client 16. Optionally, a page cache server 39 can stage copies of the modified Web pages in a page cache 40, as is known in the art.

From a client-side perspective, the modified Web content, when viewed, is indistinguishable from the original Web content, except for the addition of the definitional hyperlinks. The operation of the Web browser 17 remains unmodified and performance is unaffected, as all parsing and processing is transparently performed by the server 31, with no impact on page retrieval.

In the described embodiment, individual glossaries can be maintained to provide various types of vocabularies, including vocabularies generalized or specialized to an individual audience or skill level. Additionally, glossaries can assist in providing internationalized or localized Web content based on meta-tags embedded in the Web content request.

Similarly, rule sets can be applied during the construction of definitional hyperlinks and definitions to improve the presentation of information. For instance, a rule set could implement the rules of style. An example rule would be to provide a full glossary definition on only the first occurrence of each individual term or phrase and to merely refer back to the first definition for each subsequent occurrence of the term or phrase. Other forms of rules or rule sets are possible, as would be recognized by one skilled in the art.

Figure 3B:
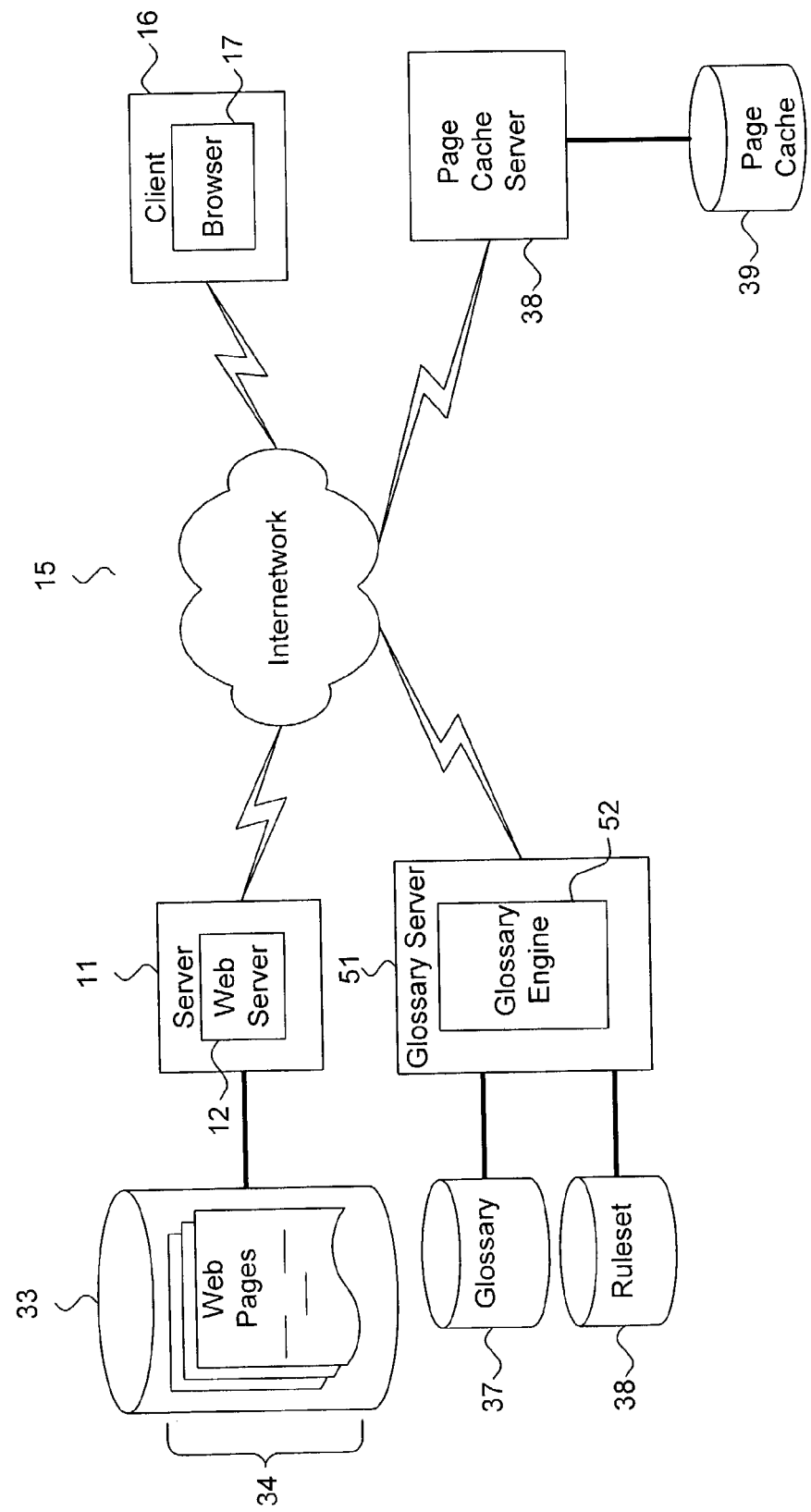
FIG. 3B is a block diagram showing a system for appending server-side glossary definitions to transient Web content in a networked computing environment in accordance with a further embodiment of the present invention.

FIG. 3B is a block diagram showing a system for appending server-side glossary definitions to transient Web content 36 in a networked computing environment 45 in accordance with a further embodiment of the present invention. As before, the server 11 and client 16 communicate via the internetwork 15. A Web browser 17 executing on the client 16 sends requests for Web content to the server 11. In response, a Web server 12 executing on the server 11 retrieves the static Web content 36 from an attached storage device 33 for transmission back to the client 16. The Web content 36 can be written in a tag-delimited page description language, such as HTML, or can be in an unstructured format that includes parseable text.

A glossary server 46 executes as a separate machine and is logically interposed between the server 11 and client 16 to intercept the requested Web content 36. Prior to sending each requested Web page to the client 16, a glossary engine 47 executing on the glossary server 46 intercepts each requested Web page from the Web server 12. The Web pages are parsed to identify definable terms and to generate the necessary definitional hyperlinks, as further described below, beginning with reference to FIG. 4. Briefly, the glossary engine 47 references an attached glossary 37 and, optionally, a rule set 38, during the processing of each Web page. Upon the completion of parsing and processing, each Web page will have been modified, if necessary, to include definitional hyperlinks, and the modified Web pages are forwarded to the requesting client 16. As before, optionally, the page cache server 39 can stage copies of the modified Web pages in the page cache 40, as is known in the art.

Separating the glossary server 46 from the server 11 can be beneficial. First, utilizing separate sets of processing resources allows the Web server 12 to operate without the additional load occasioned by a coupled glossary engine. As well, a separate glossary server can operate on a wider set of Web pages, including those Web pages originating from the server 11, as well as from other sources.

Software Modules

Figure 4:
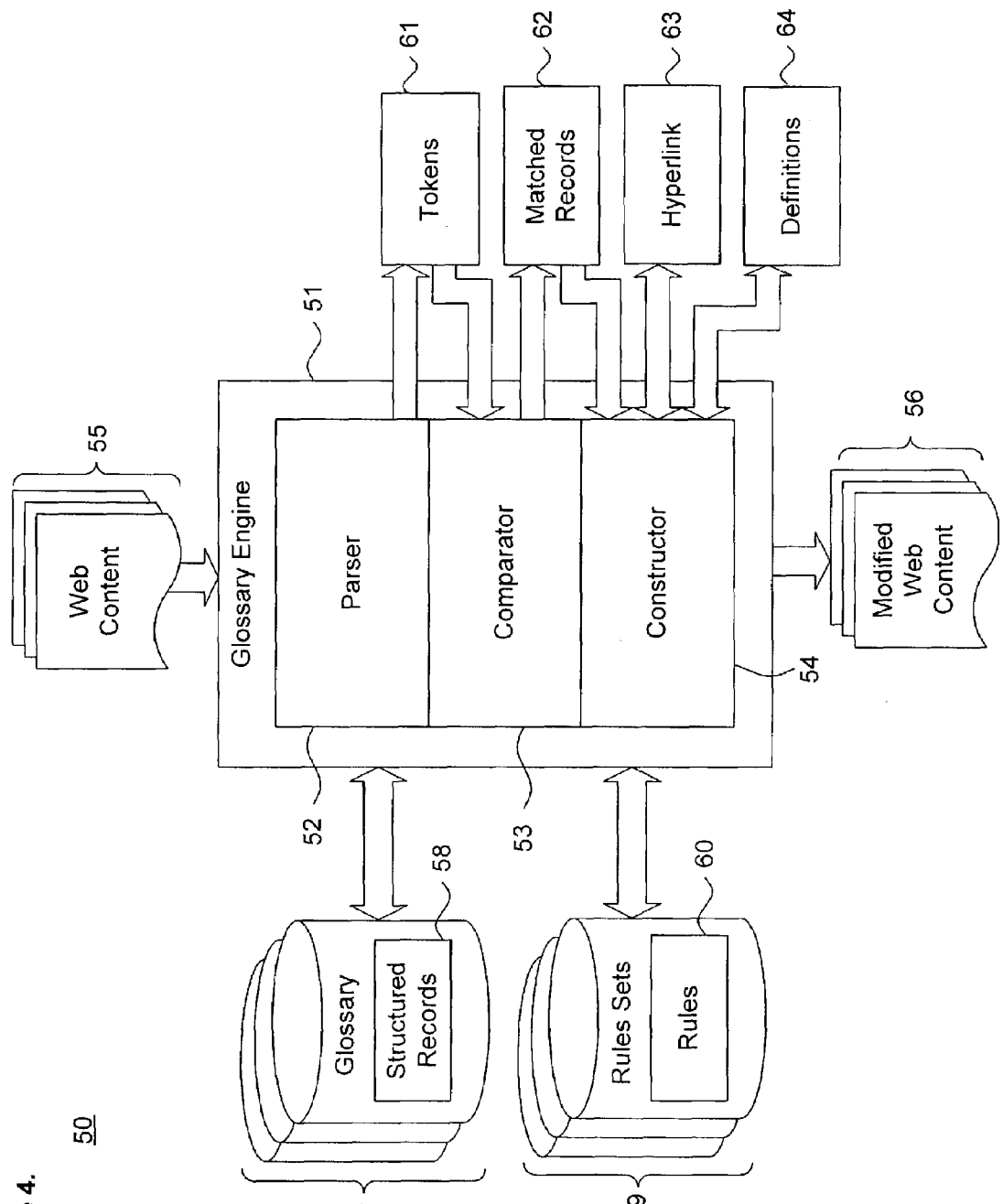
FIG. 4 is a block diagram showing the software modules implementing the glossary engine used by the systems of FIGS. 3A and 3B.

FIG. 4 is a block diagram showing the software modules 65 implementing the glossary engines 35, 37 used by the systems 30, 35 of FIGS. 3A and 3B, respectively. For simplicity, a glossary engine 51 is described without reference to either a glossary engine 35 executing on a Web server 34 (shown in FIG. 3A) or to a dedicated glossary server 46 (shown in FIG. 3B). Except as noted, the functionality provided by the glossary engine 51 is otherwise identical.

The glossary engine 51 includes three principal modules: parser 52, comparator 53, and constructor 54. The glossary engine 51 receives Web content 55 originating from a Web server 31. The Web content 55 could be in the form of formatted text written in a tag-delimited page description language, such as HTML, or could be unstructured text that is converted into formatted Web pages by the constructor 54 prior to delivery to a requesting client 16. The Web content 55 is parsed by the parser 52 into individual tokens 61 representing preferably case-insensitive key words. The comparator module 53 receives each of the tokens 61, which are formed into a stream of tokens, for comparison to structured records 58 containing the glossary definitions. The glossary engine 51 interfaces to one or more glossaries 57 and, optionally, one or more rule sets 59, to respectively enable the inclusion of internationalized, localized, generalized, and specialized glossary definitions and various rule sets, such as based on the rules expounded in W. Strunk Jr. et al., "The Elements of Style," Allyn & Bacon (4th ed. 2000), the disclosure of which is incorporated by reference.

The tokens 61 are compared to the structured records 58 by the comparator module 53 using a logically-defined sliding window and a set of matched records 62 is identified. The constructor module 54 receives the matched records 62 and forms definitional hyperlinks 63 and appended definitions 64. The constructor 54 optionally applies rules 60 retrieved from the rule sets 59 while forming the definitional hyperlinks 63 and definitions 64. Also, the constructor 54 converts the original Web content, when received as unstructured text, into formatted Web content prior to forwarding. The Web content 55 is then forwarded as modified Web content 56 by the constructor 54, following application of the rule sets 59, if applicable.

Process Flow

Figure 5:
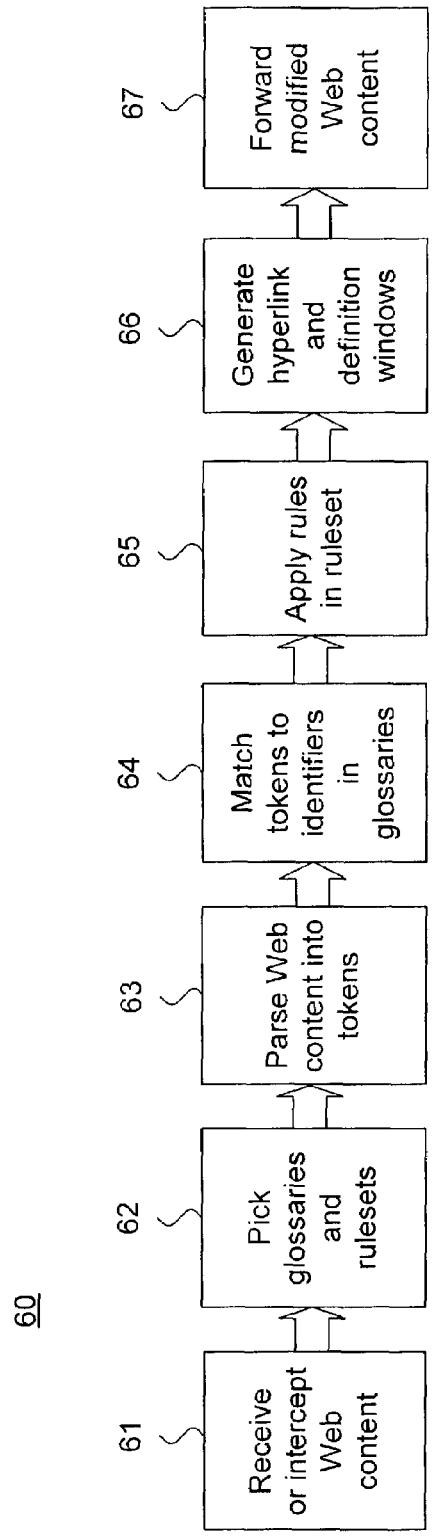
FIG. 5 is a process flow diagram showing the appending of server-side glossary definitions using the system of FIG. 1.

FIG. 5 is a process flow diagram 60 showing the appending of server-side glossary definitions 64 using the systems 30, 45 of FIGS. 3A and 3B, respectively. The process is executed by a glossary engine 51 (shown in FIG. 4) as a sequence of operations performable by a server and without modification to Web browsers executing on clients. First, Web content 55 is received or intercepted by the glossary engine 51 (process 61). Individual glossaries 57 and rule sets 59 are selected by the glossary engine 51 prior to processing (process 62). The Web content 55 is parsed into individual tokens (process 63) and the tokens are matched to identifiers in the glossaries 57 using a logically-defined sliding window (process 64). Optionally, rules in the rule set 59 are applied (process 65) prior to generating the definitional hyperlinks and definitions windows (process 66). Finally, the modified Web content 55 is forwarded onto the requested client (process 67).

Logical Search Window

Figure 6:
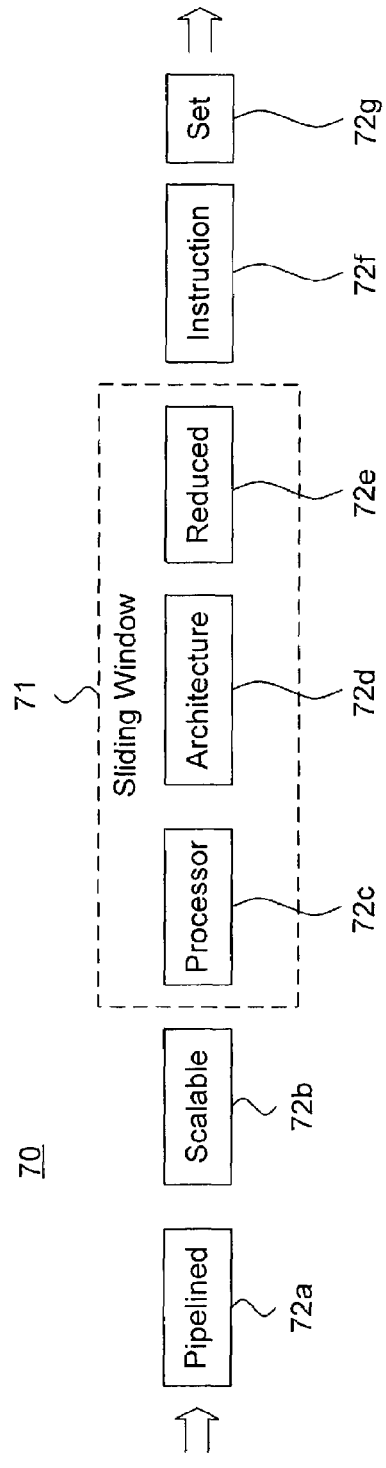
FIG. 6 is a functional block diagram showing a logical search window for identifying potential matching definitions for use in the systems of FIGS. 3A and 3B, respectively.

FIG. 6 is a functional block diagram 70 showing a logical search window 71 for identifying potential matching definitions for use in the systems 30, 35 of FIGS. 3A and 3B, respectively. The sliding window 71 allows both individual terms and phrases to be matched against the glossaries 57. The parsed tokens 61 (shown in FIG. 4) are formed into a continuous stream for matching against the glossaries 57. Each of the individual tokens $72a-72g$ are received by the comparator module 53 and matched against the structured records 58 using the sliding window 71. The glossary engine attempts to match first one token, then a pair of adjacent tokens, followed by a string of successive tokens until a match is found or the sliding window size has been met. If a token or token string fails to match, the oldest token is skipped and a new token is received into the sliding window 71. The tokens in the sliding window 71 are matched in a case-insensitive fashion and could optionally be normalized to a root word form prior to comparison.

For example, assume a continuous stream containing, from left to right, the tokens, "Pipelined," "Scalable," "Processor," "Architecture," "Reduced," "Instruction," and "Set" with a sliding window size equal to three words. When the token "Reduced" $72e$ enters the sliding window 71, the comparator module 53 attempts to find a match in the structured records 58. If no match is found, the next token "Architecture" $72d$ is compared with the token "Reduced" $72e$. If no match is found, the next token "Processor" $72c$ is compared with the tokens "Architecture" $72d$ and "Reduced" $72e$. If no match is found, the token "Reduced" $72e$ remains undefined and leaves the sliding window 71.

Data Structures

Figure 7:
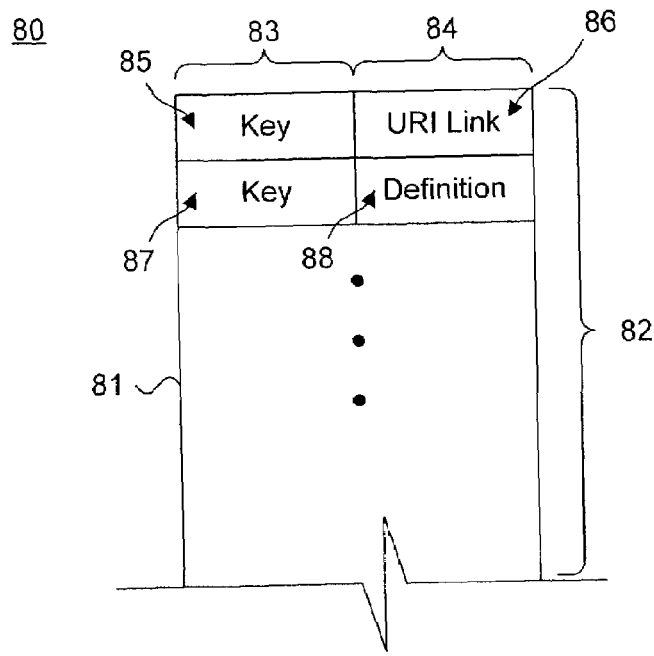
FIG. 7 is a block diagram showing a data structure for records containing definitions in accordance with an embodiment of the present invention.

FIG. 7 is a block diagram 80 showing a data structure 81 for records 82 containing definitions in accordance with an embodiment of the present invention. The records 82 are structured into an Identifier field 83 and a Data field 84. The Identifier field 83 stores hashed key words corresponding to definitions in the glossary 57. Each hashed key word functions as a key 85, 87 to individual records 82. The Identifier field 84 stores either an indirect reference, URI Link 86, to the location of the definition for the hashed key word, or incorporates the actual definition, Definition 88, directly into the records 82.

Figure 8:
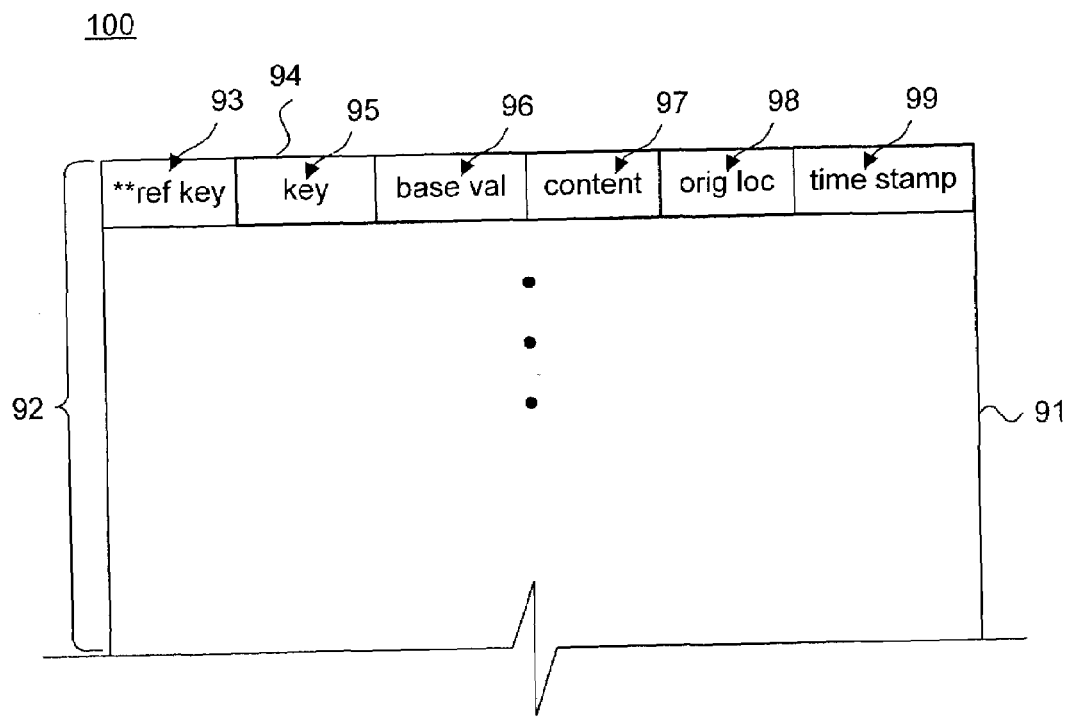
FIG. 8 is a block diagram showing a database schema for maintaining structured records containing definitions in accordance with a further embodiment of the present invention.

FIG. 8 is a block diagram 90 showing a database schema 91 for maintaining structured records containing definitions in accordance with a further embodiment of the present invention. Each record 92 is structured into two principal sections, a reference key field  refkey 93 and tuple 94. The tuple 94 contains five fields: key 95, base value (baseval) 96, content 97, original location (orig loc) 98, and timestamp 99. The contents of the key field 95 reference back to the reference key field 93. The contents of the base value field 96 allow a new key to be generated for the tuple 94. The tuple 94 allows all definitions to be maintained in a single store while enabling replacement of definitions by third parties. The definitions are maintained in the contents field 97 with reference to the original location 98 and timestamp 99 of the definition. Definitions can be replaced by generating a new tuple 94 using the base value 96 to generate a key 94**.

Server-Side Glossary Definition Appending Method

Figure 9:
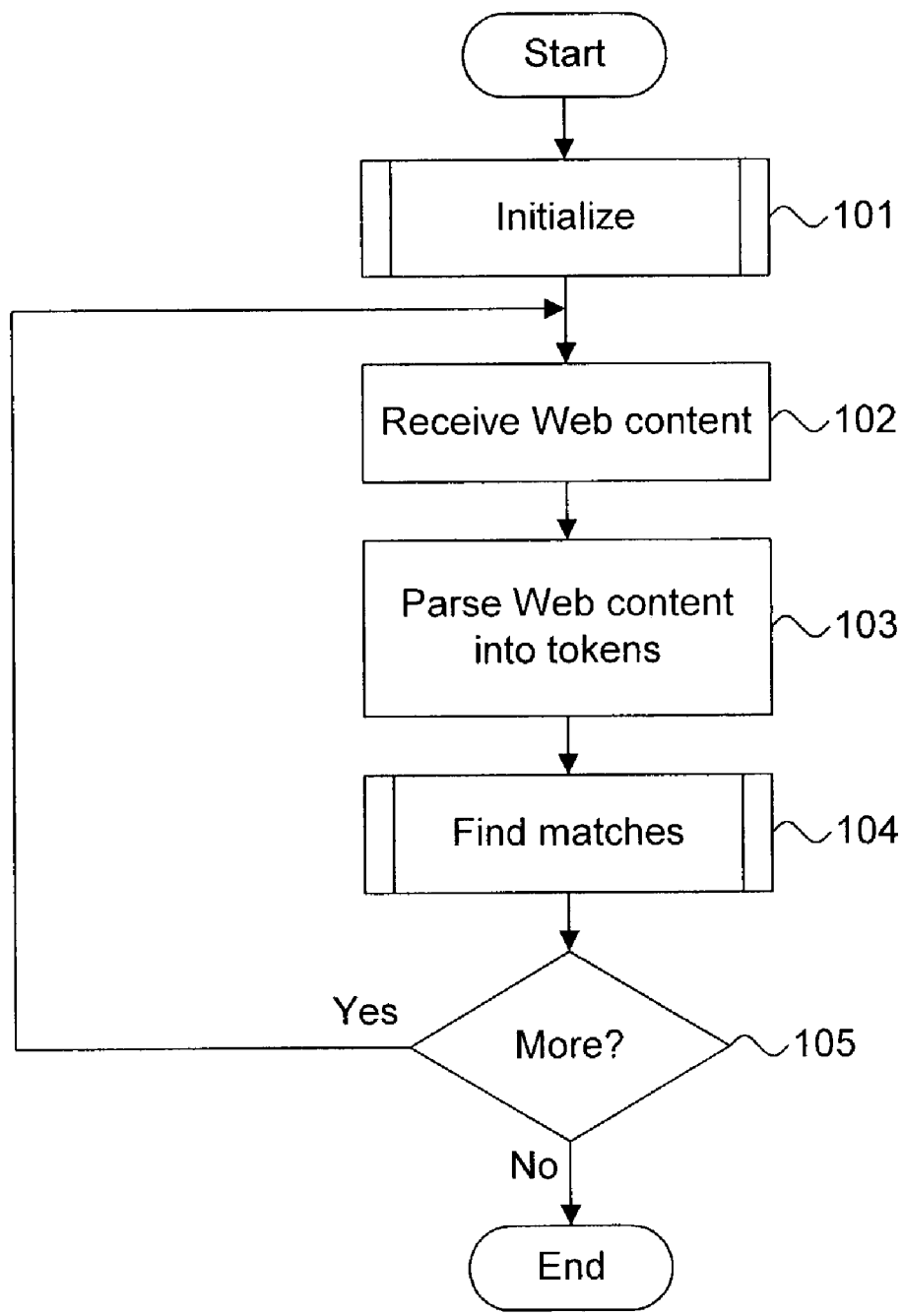
FIG. 9 is a flow diagram showing a method for appending server-side glossary definitions to transient Web content in a networked computing environment in accordance with an embodiment of the present invention.

FIG. 9 is a flow diagram showing a method for appending server-side glossary definitions 100 to transient Web content in a networked computing environment in accordance with an embodiment of the present invention. The method is executed as a sequence of process steps by a glossary engine 51 (shown in FIG. 4). The method 100 can be performed either on-demand or in batch mode. When operating on-demand, Web content is parsed and processed against the glossaries only when the Web content is specifically requested by a Web browser and is in transit to a browser application 17. In batch operation, all Web content is parsed and processed off-line and prior to being specifically requested.

Preliminarily, the glossaries and rule sets used by the glossary engine are initialized (step 101), as further described below with reference to FIG. 10. Iterative processing of Web content then commences as follows. First, Web content is received or intercepted (step 102) and parsed into individual tokens (block 103), as is known in the art. The individual tokens are compared to the glossaries 57 to find matches using a sliding window (step 104), as further described below with reference to FIG. 10. If further Web content requires processing (step 105), processing continues as above. Otherwise (block 105), the method terminates.

Initialization

Figure 10:
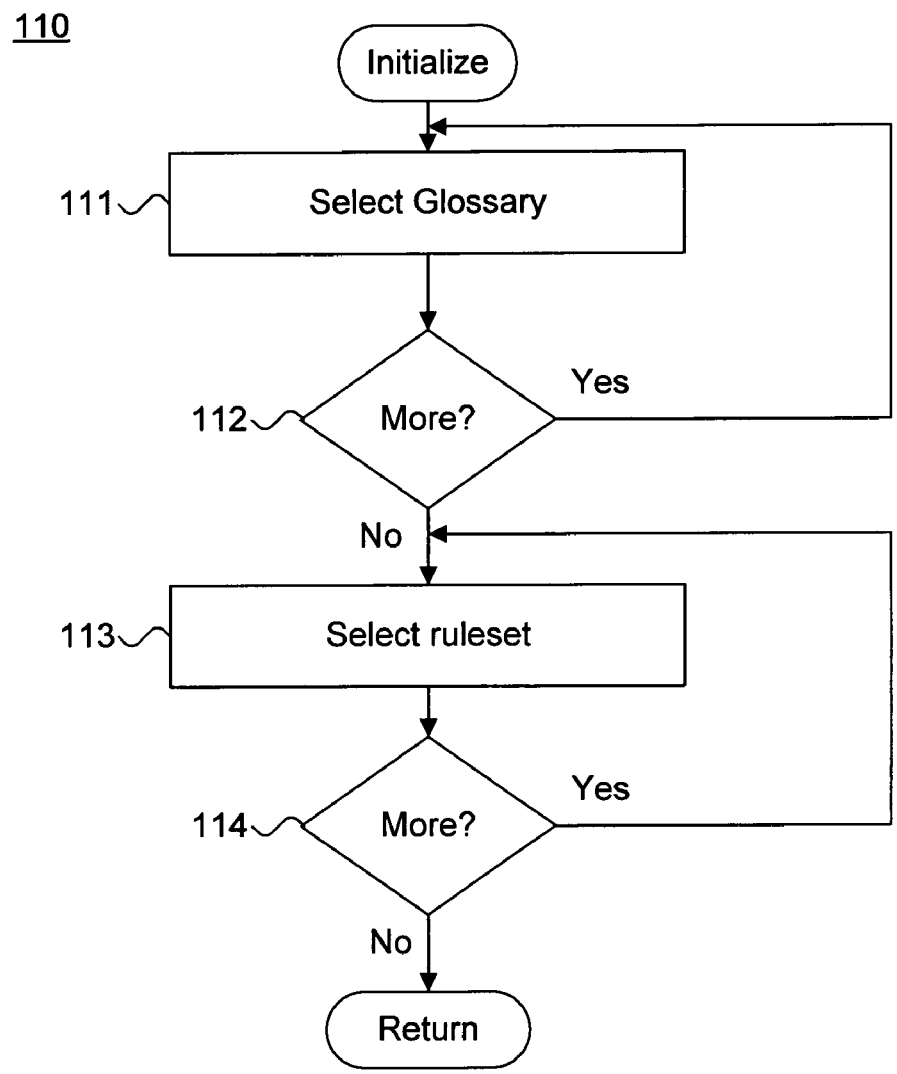
FIG. 10 is a flow diagram showing a routine for performing initialization for use in the method of FIG. 9.

FIG. 10 is a flow diagram showing a routine for performing initialization 110 for use in the method 100 of FIG. 9. The purpose of this routine is to select the glossaries and rule sets used by the glossary engine.

First, a glossary 57 is selected (step 111). If more glossaries are being utilized, such as for internationalization, localization, generalization, or specialization (block 112), glossary selection continues as above. Otherwise (step 112), a first rule set 59 is selected (step 113). If other rule sets are being used by the glossary engine (block 114), selection of rule sets continues as above. Otherwise (step 114), the routine returns.

Match Finding

Figure 11:
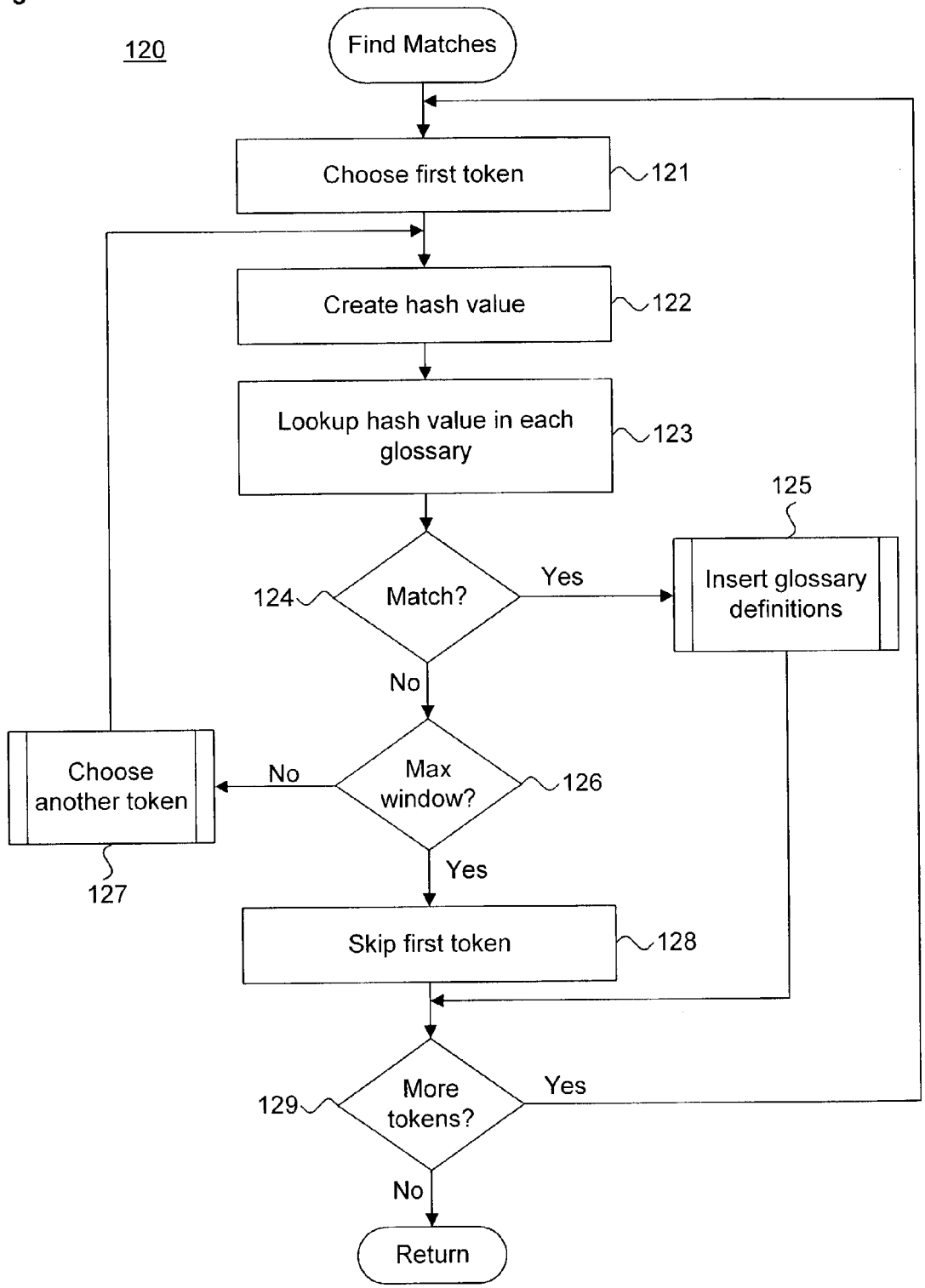
FIG. 11 is a flow diagram showing a routine for finding matches for use in the method of FIG. 9.

FIG. 11 is a flow diagram showing a routine for finding matches 120 for use in the method 100 of FIG. 9. The purpose of this routine is to match individual tokens and those tokens currently in a logically-defined sliding window 71 (shown in FIG. 6) against a glossary 57 (shown in FIG. 4).

Tokens are iteratively processed as follows. A first token is chosen (step 121) and a hash value is created (step 122). The hash value is compared to each glossary 57 (step 123) by comparison to the contents of the key field 83 (shown in FIG. 7). If the hash value matches (step 124), the glossary definition is inserted (step 125), as further described below with reference to FIG. 12. Otherwise (step 124), if the maximum window size has not been exceeded (step 126), another token is chosen to be added to the logical sliding window 71 (step 127) and comparison continues as above. Otherwise, if the maximum logical sliding window size has been met (step 126), the first, and oldest, token fails to match any term or phrase in the glossaries 57 and is skipped (step 128). If more tokens are available in the stream of tokens (step 129), processing continues as above. Otherwise (step 129), the routine returns.

Glossary Definition Insertion

Figure 12:
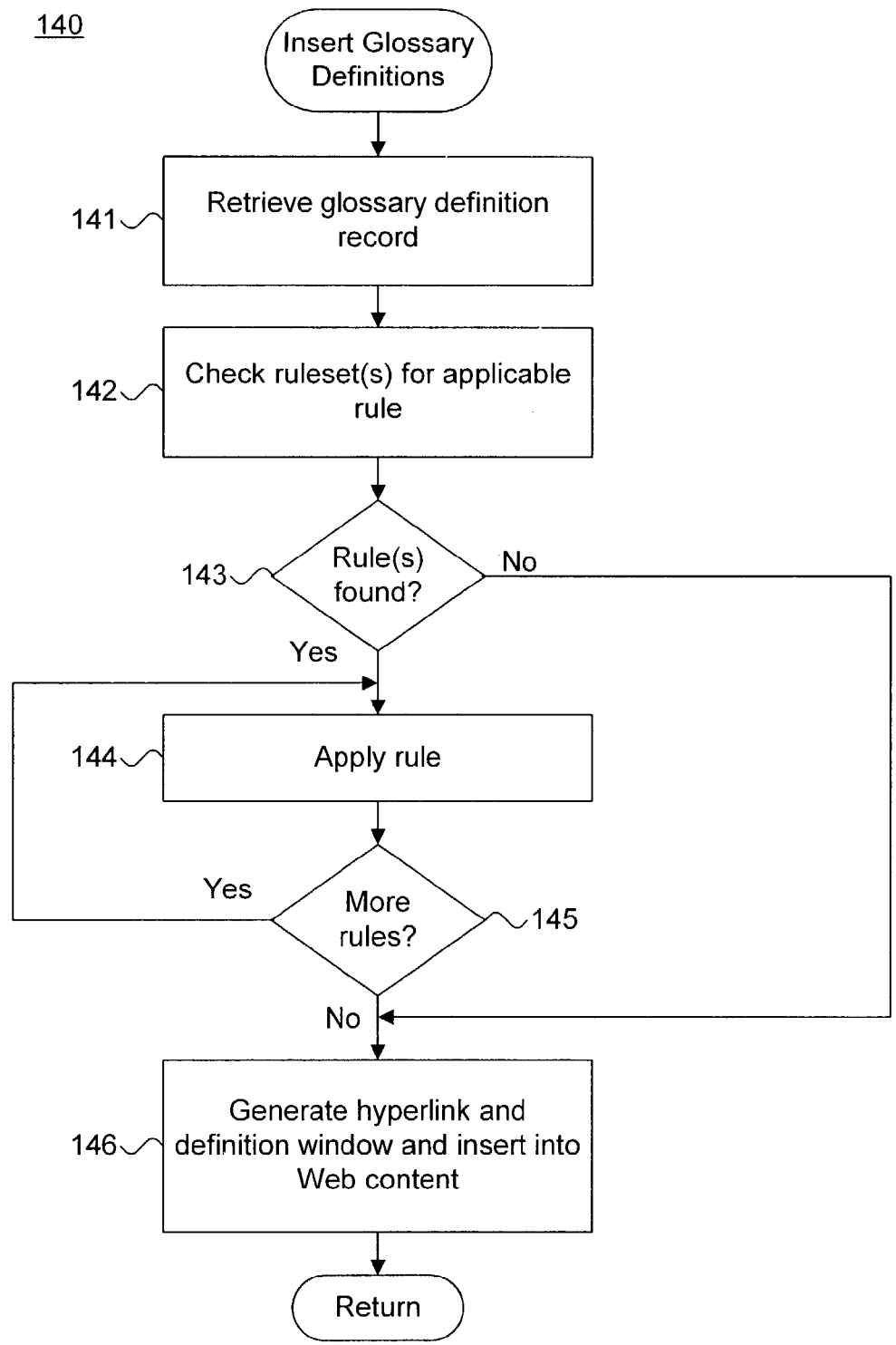
FIG. 12 is a flow diagram showing a routine for inserting glossary definitions for use in the method of FIG. 11.

FIG. 12 is a flow diagram showing a routine for inserting glossary definitions 12 for use in the method 100 of FIG. 11. The purpose of this routine is to construct a definitional hyperlink 63 and definition, in the form of a definition window 64 (shown in FIG. 4).

The glossary definition is retrieved (step 141). For those structured records providing an indirect inference to a glossary definition using a URI link field 84 (shown in FIG. 7) the glossary definition is retrieved using the URI link. Otherwise, the glossary definition is retrieved directly from the content field 97 of a tuple 94 (shown in FIG. 8).

Next, the applicable rules set 59 is checked for applicable rules 60 (step 142). If a rule is found (step 143), the rule is applied (step 144). If more rules require application (step 145), application continues as above. Otherwise (step 145), the definitional hyperlink 63 and definition window 64 are generated and inserted into the Web content in lieu of the term or phrase corresponding to the matched tokens (step 146), preferably in the form of a HTML meta-tag as follows:

<A href="[URI link]"word/A> where URI link refers to the location from which the definition can be retrieved and word is the word or phrase being defined. Other forms of tags and definitional glossary insertion techniques could be used, as would be recognized by one skilled in the art. The routine then returns.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for appending server-side glossary definitions to transient Web content in a networked computing environment, comprising:
    a glossary database configured to store a glossary comprising a plurality of structured records, each structured record keyed by a unique identifier derived from a key word and containing a definition associated with the key word;
    a parser configured to receive Web content comprising text in transit to a Web client and parsing the text into one or more tokens corresponding to one such key word;
    a comparator module configured to match the tokens against each unique identifier in the glossary and retrieving each structured record containing a matching unique identifier; and
    a constructor configured to insert a hyperlink in place of the text corresponding to each matched token, and to reference the definition contained in the retrieved structured record for the matching unique identifier to include the definition in a modified Web content, wherein the modified Web content and the definition are sent to the Web client.

2. A system according to claim 1, further comprising:
a hash module hashing each key word into a hash key from a base value and storing the hash key as the unique identifier into the structured record for the associated key word, and hashing the one or more tokens using the base value prior to matching against each unique identifier in the glossary.

3. A system according to claim 2, further comprising:
a database module forming a tuple, comprising the hash key, the base value, the definition for the associated key word, an original location reference, and a time stamp, and storing one such tuple in each structured record in lieu of the definition associated with the keyword.

4. A system according to claim 1, further comprising:
a rules database storing a set of rules comprising a plurality of structured records, each structured record containing a rule governing insertion of the definitions into the Web content.

5. A system according to claim 4, further comprising:
a rules module applying at least one such rule from the rules set prior to inserting the hyperlink in place of the text.

6. A system according to claim 1, further comprising:
a Web browser presenting the referenced definition in a pop-up dialogue window responsive to a selection of the inserted hyperlink.

7. A system according to claim 1, further comprising:
a page cache transitorily staging the Web content following insertion of the hyperlink for subsequent retrieval by other Web clients.

8. A system according to claim 1, wherein the glossary database provides one or more glossaries relating to at least one of internationalization, localization, generalization, and specialization.

9. A system according to claim 1, further comprising:
an input buffer receiving the text stream as a Web page comprising one or more statements written as a tag-delimited page description language.

10. A system according to claim 9, wherein the page description language comprises HTML.

11. A system according to claim 1, further comprising:
a matching module logically defining a sliding window comprising one or more of the tokens, and matching successive combinations of the tokens within the sliding window against the identifiers in the glossary.

12. A system according to claim 1, wherein each identifier is formed as a combination of one or more key words.

13. A system according to claim 1, wherein each token is normalized to a root word form.

14. A method for appending server-side glossary definitions to transient Web content in a networked computing environment, comprising:
maintaining a glossary comprising a plurality of structured records, each structured record keyed by a unique identifier derived from a key word and containing a definition associated with the key word;
receiving Web content comprising text in transit to a Web client and parsing the text into one or more tokens corresponding to one such key word;
matching the tokens against each unique identifier in the glossary and retrieving each structured record containing a matching unique identifier; and
inserting a hyperlink in place of the text corresponding to each matched token, and referencing the definition contained in the retrieved structured record for the matching unique identifier so as to include the definition in a modified Web content, wherein the modified Web content and the definition are sent to the Web client.

15. A method according to claim 14, further comprising:
hashing each key word into a hash key from a base value;
storing the hash key as the unique identifier into the structured record for the associated key word; and
hashing the one or more tokens using the base value prior to matching against each unique identifier in the glossary.

16. A method according to claim 15, further comprising:
forming a tuple, comprising the hash key, the base value, the definition for the associated key word, an original location reference, and a time stamp; and
storing one such tuple in each structured record in lieu of the definition associated with the keyword.

17. A method according to claim 14, further comprising:
maintaining a set of rules comprising a plurality of structured records, each structured record containing a rule governing insertion of the definitions into the Web content.

18. A method according to claim 17, further comprising:
applying at least one such rule from the rules set prior to inserting the hyperlink in place of the text.

19. A method according to claim 14, further comprising:
presenting the referenced definition in a pop-up dialogue window responsive to a selection of the inserted hyperlink.

20. A method according to claim 14, further comprising:
transitorily staging the Web content following insertion of the hyperlink for subsequent retrieval by other Web clients.

21. A method according to claim 14, further comprising:
providing one or more glossaries relating to at least one of internationalization, localization, generalization, and specialization.

22. A method according to claim 14, further comprising:
receiving the text stream as a Web page comprising one or more statements written as a tag-delimited page description language.

23. A method according to claim 22, wherein the page description language comprises HTML.

24. A method according to claim 14, further comprising:
logically defining a sliding window comprising one or more of the tokens; and
matching successive combinations of the tokens within the sliding window against the identifiers in the glossary.

25. A method according to claim 14, further comprising:
forming each identifier as a combination of one or more key words.

26. A method according to claim 14, further comprising:
normalizing each token to a root word form.

27. A computer-readable storage medium holding instructions that when executed by a computer cause the computer to perform a method for appending server-side glossary definitions to transient Web content in a networked computing environment, comprising:
maintaining a glossary comprising a plurality of structured records, each structured record keyed by a unique identifier derived from a key word and containing a definition associated with the key word;
receiving Web content comprising text in transit to a Web client and parsing the text into one or more tokens corresponding to one such key word;

matching the tokens against each unique identifier in the glossary and retrieving each structured record containing a matching unique identifier; and inserting a hyperlink in place of the text corresponding to each matched token, and referencing the definition contained in the retrieved structured record for the matching unique identifier so as to include the definition in a modified Web content, wherein the modified Web content and the definition are sent to the Web client.

28. A computer-readable storage medium according to claim 27, further comprising:

hashing each key word into a hash key from a base value;

storing the hash key as the unique identifier into the structured record for the associated key word; and hashing the one or more tokens using the base value prior to matching against each unique identifier in the glossary.

29. A computer-readable storage medium according to claim 28, further comprising:

forming a tuple, comprising the hash key, the base value, the definition for the associated key word, an original location reference, and a time stamp; and storing one such tuple in each structured record in lieu of the definition associated with the keyword.

30. A computer-readable storage medium according to claim 27, further comprising:

maintaining a set of rules comprising a plurality of structured records, each structured record containing a rule governing insertion of the definitions into the Web content.

31. A computer-readable storage medium according to claim 30, further comprising:

applying at least one such rule from the rules set prior to inserting the hyperlink in place of the text.

32. A computer-readable storage medium according to claim 27, further comprising:

presenting the referenced definition in a pop-up dialogue window responsive to a selection of the inserted hyperlink.

33. A computer-readable storage medium according to claim 27, further comprising:

transitorily staging the Web content following insertion of the hyperlink for subsequent retrieval by other Web clients.

34. A computer-readable storage medium according to claim 27, further comprising:

providing one or more glossaries relating to at least one of internationalization, localization, generalization, and specialization.

35. A computer-readable storage medium according to claim 27, further comprising:

receiving the text stream as a Web page comprising one or more statements written as a tag-delimited page description language.

36. A computer-readable storage medium according to claim 35, wherein the page description language comprises HTML.

37. A computer-readable storage medium according to claim 27, further comprising:

logically defining a sliding window comprising one or more of the tokens; and matching successive combinations of the tokens within the sliding window against the identifiers in the glossary.

38. A computer-readable storage medium according to claim 27, further comprising:

forming each identifier as a combination of one or more key words.

39. A computer-readable storage medium according to claim 27, further comprising:

normalizing each token to a root word form.

40. An apparatus for appending server-side glossary definitions to transient Web content in a networked computing environment, comprising:

means for maintaining a glossary comprising a plurality of structured records, each structured record keyed by a unique identifier derived from a key word and containing a definition associated with the key word;

means for receiving Web content comprising text in transit to a Web client and means for parsing the text into one or more tokens corresponding to one such key word;

means for matching the tokens against each unique identifier in the glossary and means for retrieving each structured record containing a matching unique identifier; and means for inserting a hyperlink in place of the text corresponding to each matched token, and referencing the definition contained in the retrieved structured record for the matching unique identifier so as to include the definition in a modified Web content, wherein the modified Web content and the definition are sent to the Web client.

* * * * *